United States Patent
Su et al.

(10) Patent No.: US 11,429,626 B2
(45) Date of Patent: Aug. 30, 2022

(54) METHOD, DEVICE, AND PROGRAM PRODUCT FOR MANAGING INDEX OF STORAGE SYSTEM

(71) Applicant: EMC IP Holding Company LLC, Hopkinton, MA (US)

(72) Inventors: Pengfei Su, Shanghai (CN); Julius Jian Zhu, Shanghai (CN); Lingling Yao, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/244,931

(22) Filed: Apr. 29, 2021

(65) Prior Publication Data

US 2022/0237188 A1 Jul. 28, 2022

(30) Foreign Application Priority Data

Jan. 27, 2021 (CN) .......................... 202110112489.1

(51) Int. Cl.
| | |
|---|---|
| *G06F 16/22* | (2019.01) |
| *G06F 16/2455* | (2019.01) |
| *G06F 16/2457* | (2019.01) |
| *G06F 16/2458* | (2019.01) |
| *G06F 16/248* | (2019.01) |

(52) U.S. Cl.
CPC ...... *G06F 16/2477* (2019.01); *G06F 16/2228* (2019.01); *G06F 16/248* (2019.01); *G06F 16/24568* (2019.01); *G06F 16/24573* (2019.01)

(58) Field of Classification Search
CPC ............. G06F 16/2477; G06F 16/2228; G06F 16/24568; G06F 16/24573; G06F 16/248
See application file for complete search history.

(56) References Cited

U.S. PATENT DOCUMENTS

| | | | |
|---|---|---|---|
| 7,979,439 B1* | 7/2011 | Nordstrom | G06F 16/22 707/741 |
| 10,909,131 B1* | 2/2021 | Graham | G06F 16/901 |
| 2018/0075107 A1* | 3/2018 | Park | G06F 16/248 |
| 2019/0361780 A1* | 11/2019 | Tiwari | H04L 67/2842 |
| 2021/0124746 A1* | 4/2021 | Klaedtke | G06F 7/32 |
| 2021/0319002 A1* | 10/2021 | Ryan | G06F 16/2322 |
| 2021/0382900 A1* | 12/2021 | Mantzouratos | G06F 16/24556 |

* cited by examiner

*Primary Examiner* — Jorge A Casanova
(74) *Attorney, Agent, or Firm* — Amin, Turocy & Watson, LLP

(57) ABSTRACT

An index of a storage system is managed. For example, events in a data stream to be stored are received. According to a predetermined length of a time window and occurrence times of the events, an event among the events that occurs within the time window is determined. Based on the event, a window index node is created including an index of the event. In response to determining that a current time point meets a threshold time point corresponding to the time window, the window index node is added to the index, and the threshold time point indicates that the number of received events that occur within the time window in the data stream reaches a threshold number. Thus, an index can be created in time for a large number of events entering the storage system. Further, the storage system can be queried and updated accurately and effectively.

20 Claims, 9 Drawing Sheets

METHOD, DEVICE, AND PROGRAM PRODUCT FOR MANAGING INDEX OF STORAGE SYSTEM

RELATED APPLICATION

The present application claims the benefit of priority to Chinese Patent Application No. 202110112489.1, filed on Jan. 27, 2021, which application is hereby incorporated into the present application by reference herein in its entirety.

TECHNICAL FIELD

Various implementations of the present disclosure relate to a storage system, and more particularly, to a method, a device, and a computer program product for managing an index of the storage system.

BACKGROUND

With the development of data storage technologies, various data storage devices have been able to provide users with increasingly high data storage capabilities, and the data access speed has also been greatly improved. For a streaming data storage system, a large number of events in a data stream are continuously stored in the storage system. At present, technical solutions of creating an index for an event have been proposed. However, the performance of existing technical solutions is not satisfactory. At this moment, how to create and manage the index of the storage system with higher performances to further improve the performance of the entire storage system has become a technical problem.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Therefore, it is desirable to develop and implement a technical solution for managing an index of a storage system in a more effective manner. It is desired that the technical solution can manage the index of the storage system in a more convenient and effective manner. Further, it is desired that the created index can be used to improve the access and update efficiency of the storage system.

According to a first aspect of the present disclosure, a method for managing an index of a storage system is provided. In the method, multiple events included in a data stream to be stored in the storage system are received. According to a predetermined length of a time window and occurrence times of the multiple events, at least one event among the multiple events that occurs within the time window is determined. A window index node is created based on the at least one event, and the window index node includes an index of the at least one event. In response to determining that a current time point meets a threshold time point corresponding to the time window, the window index node is added to the index, and the threshold time point indicates that the number of received events that occur within the time window in the data stream reaches a threshold number.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically shows a block diagram of a storage system according to a technical solution.

DETAILED DESCRIPTION

Hereinafter, example implementations of the present disclosure will be described in more detail with reference to the accompanying drawings. Although the example implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or the same objects. Other explicit and implicit definitions may also be included below.

In the context of the present disclosure, events in a data stream may involve multiple types, and respective events may occur at different times. For example, in an application environment where the operation status of a data center is monitored, the data stream may include log data of respective devices in the data center. At this moment, the events in the data stream may be log data generated at various time points (for example, every minute or other time intervals). For another example, in an application environment where road traffic conditions are monitored, the data stream may include images, videos, and/or other data collected by multiple collection devices at multiple locations.

Figure 1:
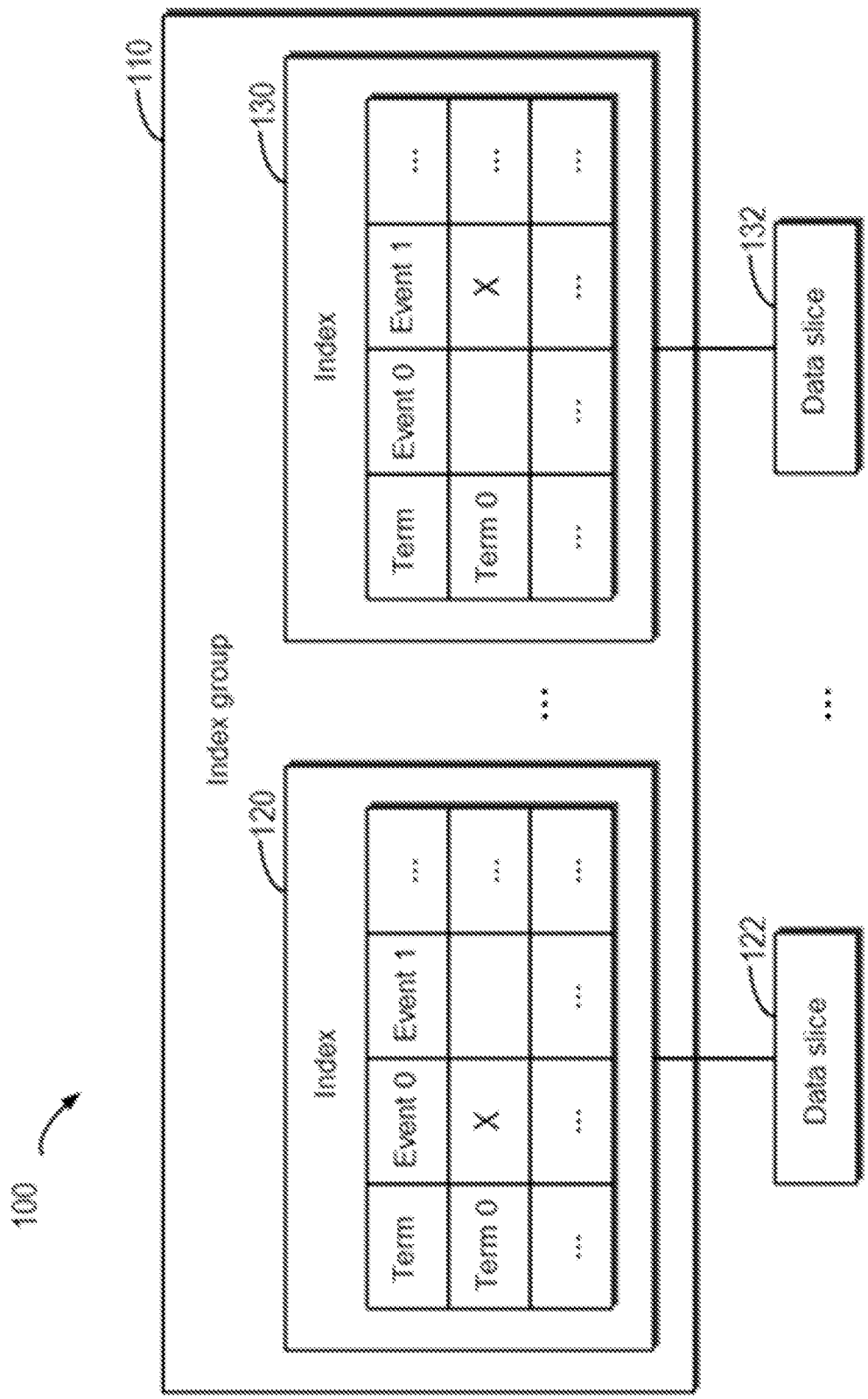

It will be understood that the data stream is continuous and may involve mass data. In order to facilitate storage, a large number of events may be divided into multiple slices based on a hash algorithm, etc., and the multiple slices may be stored in different storage devices, respectively. For ease of description, reference is first made to FIG. 1 to describe a summary of the storage system. FIG. 1 schematically shows a block diagram of a storage system according to a technical solution. As shown in FIG. 1, storage system 100 may include data slices 122, . . . 132, etc. At present, a technical solution of creating an index for a separate data slice has been proposed. For example, index 120 may be created for data slice 122, . . . , and index 130 may be created for data slice 132. At this moment, the index of storage system 100 will include index group 110, and index group 110 includes indexes 120, . . . , 130 of respective data slices. Further, storage system 100 may be managed based on index group 110.

However, users of storage system 100 need to develop a special application to manage index group 110. When a query request is received, one or more indexes corresponding to the query request may be found in index group 110 based on the hash algorithm, and then one or more query results are returned. Further, the one or more query results returned may be filtered to serve as a final query result. It will be understood that in the process of managing the index, malfunctions and/or misoperations may occur to cause errors in the index. Therefore, existing index management solutions cannot effectively manage the index of the storage system.

In order to overcome the above defect, an implementation of the present disclosure provides a technical solution for managing an index of a storage system. This technical solution proposes to create an index according to occurrence times of multiple events in a data stream. Specifically, a time window and a threshold time point of the time window are proposed. If the current time exceeds the threshold time point of a given time window, it indicates that, among the multiple events that have occurred in the given time window, the number of the events that have entered the storage system reaches a threshold number, and at this moment, the index of the events that have entered the storage system may be added to the total index of the storage system.

By using an example implementation of the present disclosure, an index may be created for the event occurring in each time window according to a predetermined length of the time window inside the storage system. In this way, the index may be managed inside the storage system, thereby avoiding users from developing index management applications themselves. Further, by using an example implementation of the present disclosure, as time passes, an index may be created for the events that have entered the storage system every time the current time point reaches the threshold time point of the corresponding time window. In this way, the index may be created timely and effectively, and a delay in the process of creating the index may be avoided.

Figure 2:
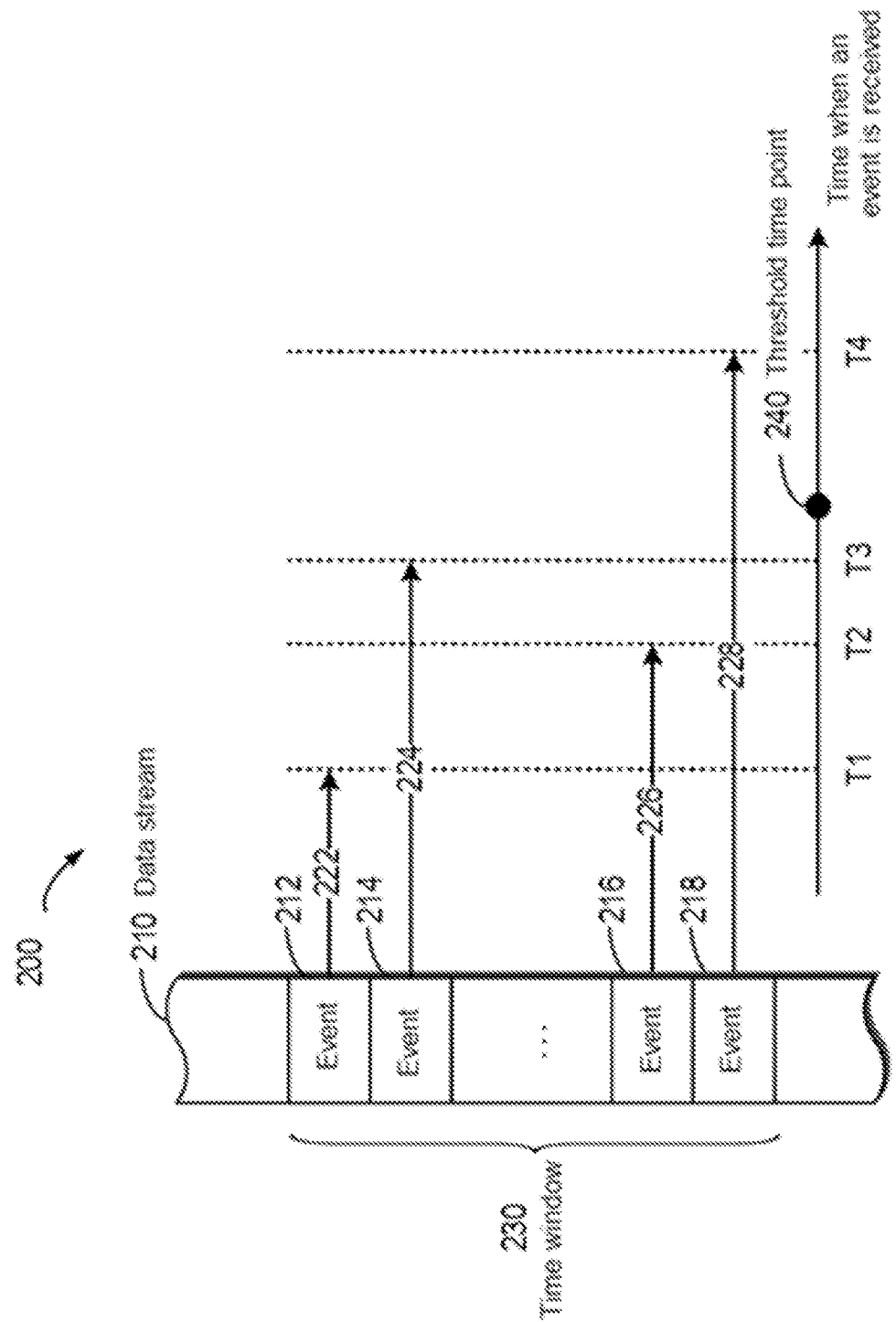
FIG. 2 schematically shows a block diagram of a process for managing an index of a storage system according to an example implementation of the present disclosure.

Hereinafter, a process according to an example implementation of the present disclosure is described in general with reference to FIG. 2. FIG. 2 schematically shows a block diagram of process 200 for managing an index of a storage system according to an example implementation of the present disclosure. Data stream 210 may include a large number of events. Data stream 210 here is continuous, and new events may be continuously generated as time passes. As shown in FIG. 2, the length (for example, 1 minute or other numerical values) of time window 230 may be specified in advance. For example, events that occur in time window 230 may include events 212, 214, . . . 216, and 218. In an application environment where an operation status of a data center is monitored, events may include logs of respective computing devices generated at different time points.

It will be understood that the events here relate to an occurrence time and a reception time. The occurrence time refers to a time when an event occurs, for example, the generation time of a certain log. The reception time refers to a time when an event is received by storage system 100, that is, a time when the event enters storage system 100. Due to a potential delay in data transmission, the reception time will be later than the occurrence time, and in cases such as network malfunctions, there may be a large delay.

It will be understood that events that occur in a chronological order may not necessarily be received by storage system 100 in the same order. In FIG. 2, as shown by arrow 222, event 212 is received at time point T1; as shown by arrow 224, event 214 is received at time point T3; as shown by arrow 226, event 216 is received at time point T2; and as shown by arrow 228, event 218 is received at time point T4.

According to an example implementation of the present disclosure, threshold time point 240 may be set for time window 230. As shown in FIG. 2, time points T1, T2, and T3 are before threshold time point 240, and time point T4 is after threshold time point 240. That is, events 212, 214, and 216 are received before threshold time point 240, and event 218 is received after threshold time point 240. After events 212, 214, and 216 have entered storage system 100, index nodes may be created for these events. When the current time exceeds threshold time point 240, the created index nodes may be added to the index of storage system 100. In this way, it is possible to ensure that the index is created with high efficiency.

Figure 3:
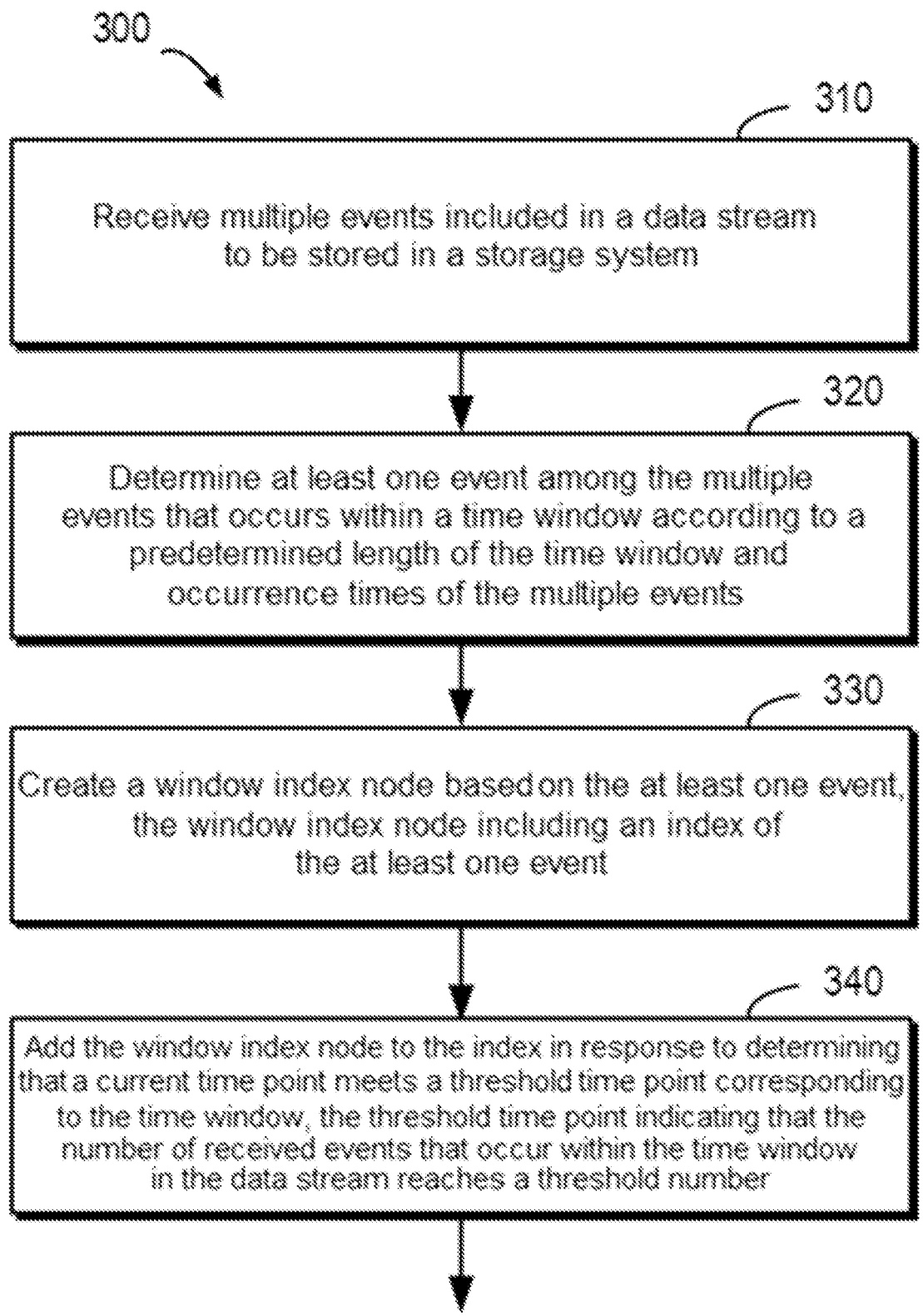
FIG. 3 schematically shows a flow chart of a method for managing an index of a storage system according to an example implementation of the present disclosure.

Hereinafter, more details of an example implementation according to the present disclosure will be described with reference to FIG. 3. FIG. 3 schematically shows a flow chart of method 300 for managing an index of a storage system according to an example implementation of the present disclosure. Method 300 may be executed at a computing resource in storage system 100. In this way, users of storage system 100 do not need to create an application for managing an index by themselves, but may directly use the index management service provided in storage system 100. At block 310 of FIG. 3, multiple events included in data stream 210 to be stored in storage system 100 are received. Here, the receiving order of the multiple events may be different from the occurrence order thereof, that is, the receiving order of the multiple events may be out of order.

At block 320, at least one event among the multiple events that occurs within time window 230 is determined according to a predetermined length of time window 230 and the occurrence times of the multiple events. Each event may have a timestamp for representing the occurrence time. The length of time window 230 may be set to 1 minute (or other numerical values), and as time passes, the time window may continuously slide forward. Assuming that time window 230 includes the 0th to 1st minute, at least one event that occurs in the 0th to 1st minute may be determined according to the timestamp of each event.

At block 330, a window index node is created based on the at least one event, and the window index node includes an index of the at least one event. According to an example implementation of the present disclosure, a window index node may be created for at least one event that occurs within time window 230 based on an index technology that has been developed at present and/or will be developed in the future. For example, an index node may first be created for each event that occurs within time window 230, and each created index node may be attached to the window index node. According to an example implementation of the present disclosure, an index node may be created based on a full-text search technology.

It will be understood that although the above only schematically shows that method 300 is executed at one computing resource in storage system 100, the storage system may include multiple computing resources. Multiple events may be received by a single computing resource, and alternatively and/or additionally, multiple events may be received in parallel by multiple computing resources. At this moment, multiple computing resources may operate in parallel to improve the efficiency of receiving events and creating corresponding index nodes based on the received events. When events are received by multiple computing resources, the events entering the storage system may be randomly assigned to any computing resource. Alternatively and/or additionally, events may be assigned to each computing resource according to the workload of each computing resource.

Specifically, method 300 may be executed by multiple threads of one or more computing devices in storage system 100. By using an example implementation of the present disclosure, multiple computing resources may process a large number of events entering storage system 100 in parallel. Multiple computing resources may operate independently, for example, may independently create segment index nodes for events that occur within time window 230. Further, the segment index nodes created by each computing resource may be attached to window index node 520.

Figure 4:
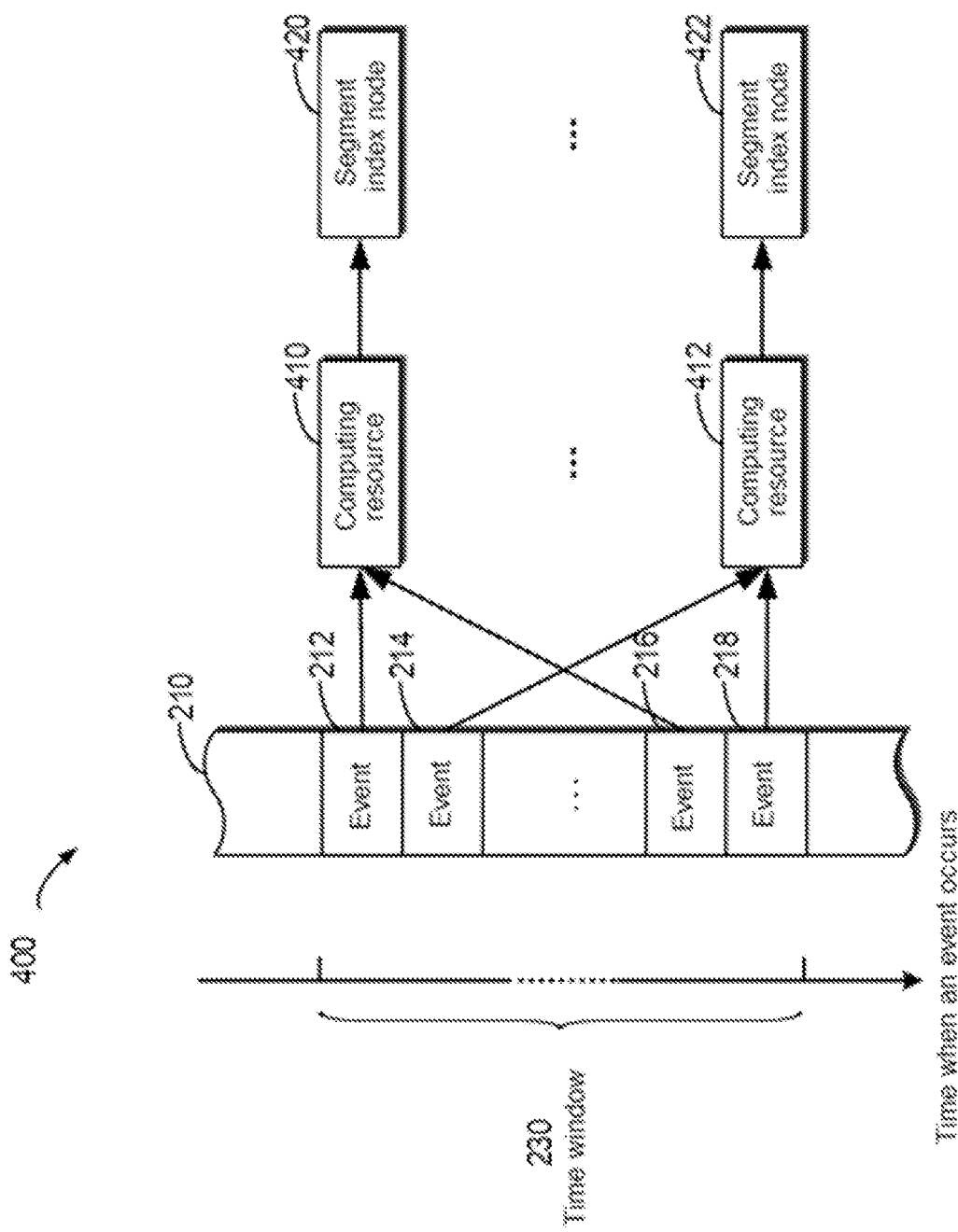
FIG. 4 schematically shows a block diagram of a process for receiving multiple events by multiple computing resources according to an example implementation of the present disclosure.

Hereinafter, more details about operations of multiple computing resources will be described with reference to FIG. 4. FIG. 4 schematically shows a block diagram of process 400 for receiving multiple events by multiple computing resources according to an example implementation of the present disclosure. As shown in FIG. 4, multiple computing resources 410, . . . , and 412 may receive respective events in parallel. For example, events 212 and 216 are received by computing resource 410; . . . , and events 214 and 218 are received by computing resource 412. At this moment, each computing resource may create a corresponding index node for each received event. For example, computing resource 410 may create segment index node 420 for events 212 and 216, and computing resource 412 may create segment index node 422 for events 214 and 218. At this moment, the time range of each segment index node 420, . . . , 422 is the same, that is, the time range of time window 230.

Figure 5:
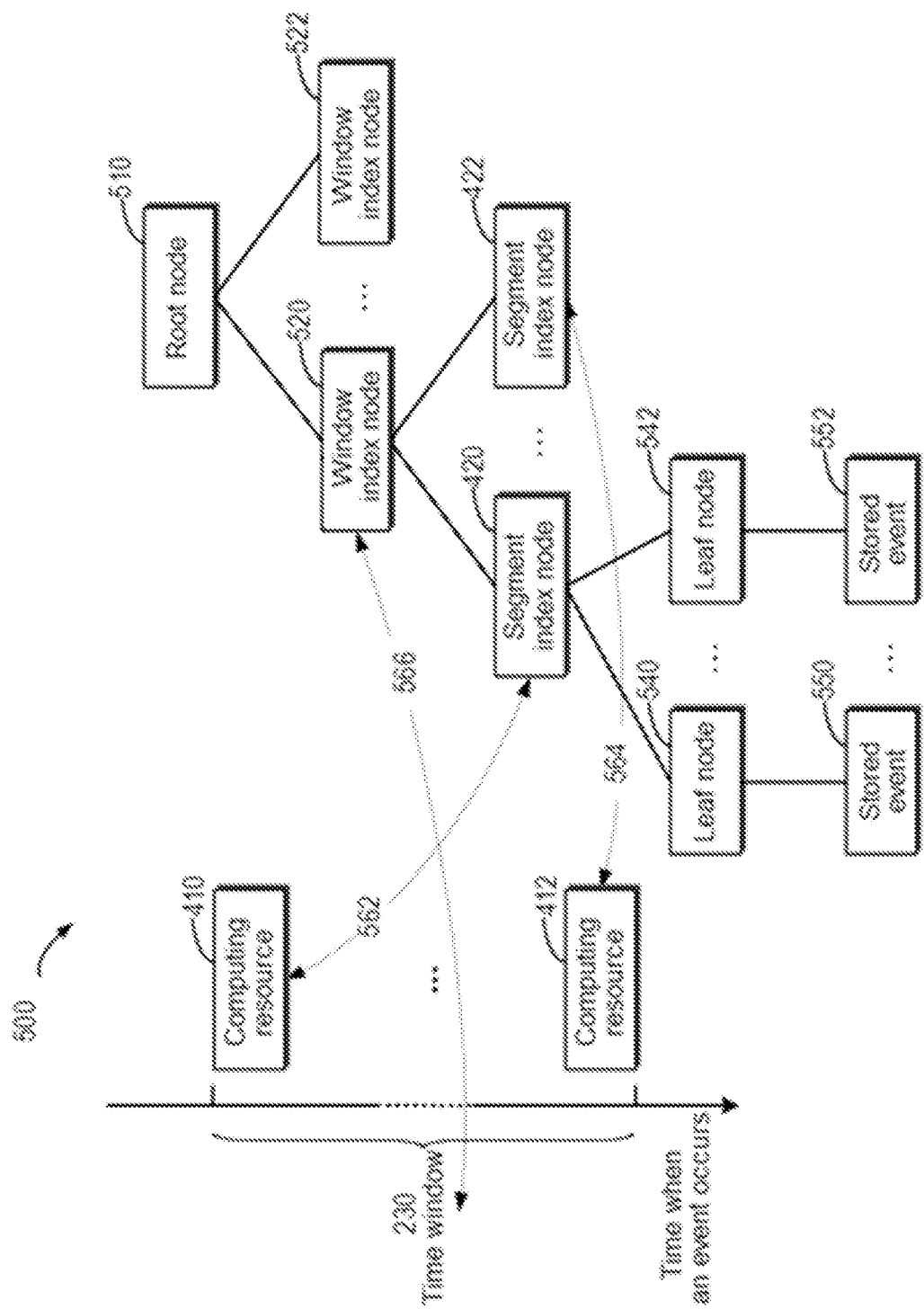
FIG. 5 schematically shows a block diagram of a process for managing an index of a storage system according to an example implementation of the present disclosure.

According to an example implementation of the present disclosure, the window index node may include multiple levels. For example, multiple segment index nodes may be created based on multiple computing resources, respectively, and each segment index node may be added to the window index node. Hereinafter, more details about creating an index will be described with reference to FIG. 5. FIG. 5 schematically shows a block diagram of process 500 for managing an index of a storage system according to an example implementation of the present disclosure. As shown in FIG. 5, the index may include root node 510, and root node 510 may include window index nodes 520, . . . , 522 established based on events in each time window, respectively. As shown by arrow 566, window index node 520 may correspond to time window 230, and window index node 522 may correspond to another time window (not shown).

Further, window index node 520 may include segment index nodes 420, . . . , 422 created based on multiple computing resources 410, . . . , 412, respectively. Here, each segment index node of the multiple segment index nodes corresponds to an event received by one computing resource of the multiple computing resources. As shown by arrow 562, segment index node 420 corresponds to computing resource 410, . . . , and as shown by arrow 564, segment index node 422 corresponds to computing resource 412. Segment index node 420 may include leaf nodes 540, . . . , 542 corresponding to events that occur within time window 230. Specifically, each leaf node may point to an event stored in storage system 100. For example, leaf node 540 may correspond to stored event 550, . . . , and leaf node 542 may correspond to stored event 552. In this way, multiple computing resources may respectively create index nodes for a large number of events in parallel, thereby improving the overall performance of the storage system.

The process of creating window index nodes, segment index nodes, and leaf nodes has been described. Hereinafter, returning to FIG. 3, how to add various created nodes to the index of storage system 100 will be described. At block 340 of FIG. 3, in response to determining that the current time point meets threshold time point 240 corresponding to time window 230, window index node 520 is added to the index. Here, threshold time point 240 indicates that, among the multiple events that occur within time window 230 in data stream 210, the number of the events that have been received reaches the threshold number.

According to an example implementation of the present disclosure, the threshold number may be expressed as a percentage, such as 95% (or other numerical values). At this moment, threshold time point 240 indicates that 95% of the events that occur within time window 230 have been transmitted to storage system 100. According to an example implementation of the present disclosure, the threshold number may be expressed by an absolute value. Assuming that 1000 events occur within time window 230, the time point when 950 events enter storage system 100 may be taken as threshold time point 240.

According to an example implementation of the present disclosure, the threshold number may be a fuzzy value.

Assuming that historical experience indicates that at the time point of the 10th second (or other lengths of time) after the end time of time window 230, most of the events that occur within time window 230 have entered storage system 100, then threshold time point 240 may be directly set as the time point of the 10th second after time window 230.

By using an example implementation of the present disclosure, it is not necessary to wait for all events that occur within time window 230 to have entered storage system 100 before creating an index for all events. Instead, at threshold time point 240, window index node 520 created based on most of the events that have entered storage system 100 is added to root node 510 of the index of storage system 100. In this way, an index may be created timely and effectively for a large number of events entering storage system 100.

According to an example implementation of the present disclosure, after window node 520 has been added to root node 510 of the index, respective segment index nodes 530, . . . , and 532 in window index node 520 may be set to a read-only state. At this moment, respective segment index nodes 530, . . . , and 532 cannot be modified, but can only be queried in order to serve access requests from the outside. It will be understood that due to a network delay or other reasons, certain events that occur within time window 230 may enter storage system 100 after window index node 520 has been added to the index. At this moment, another segment index node may be created for these late events.

Figure 6:
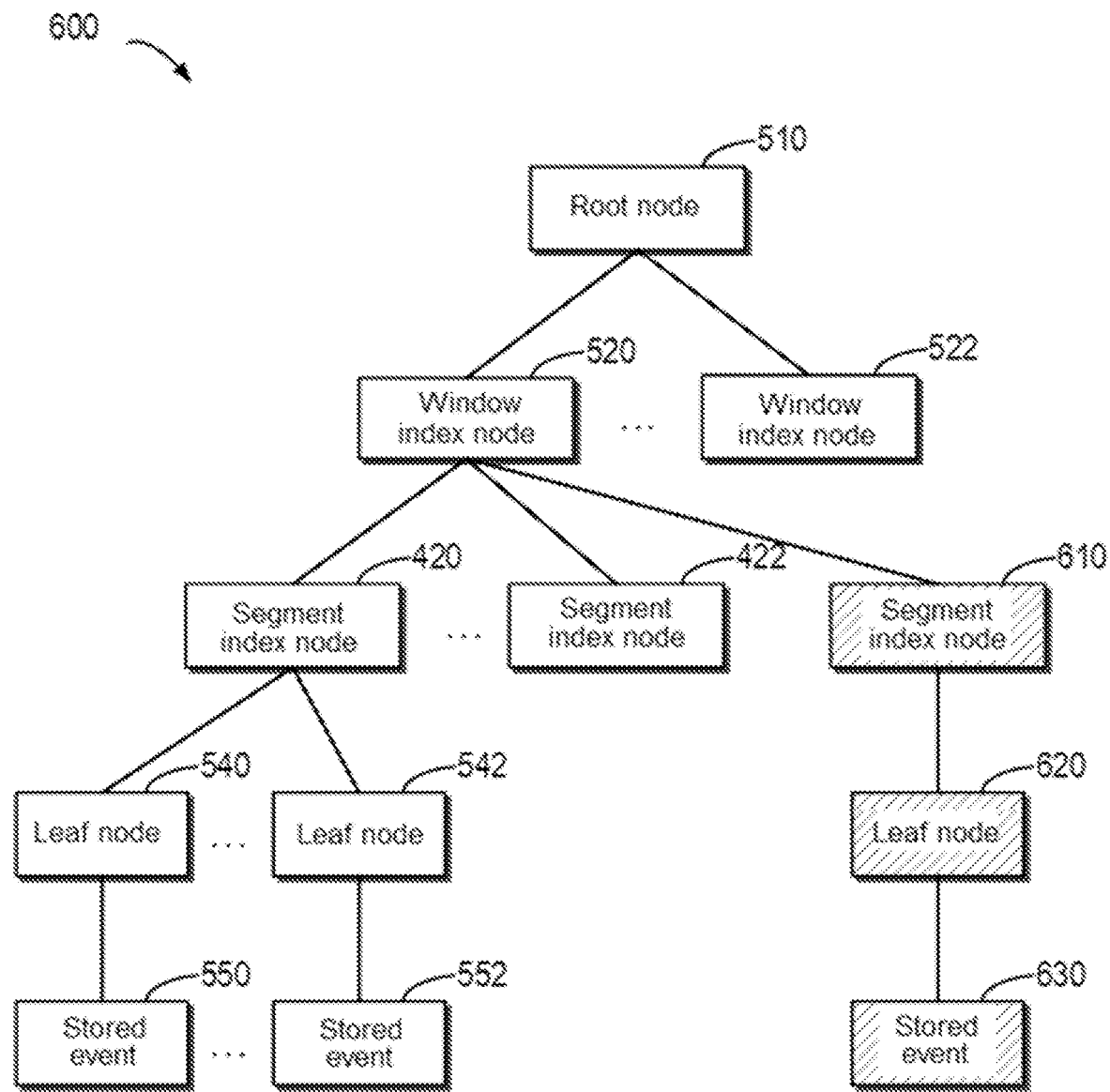
FIG. 6 schematically shows a block diagram of a process for adding segment index nodes to an index according to an example implementation of the present disclosure.

Specifically, if it is determined that an event in data stream 210 is received after threshold time point 240, another new segment index node may be created based on the event. Hereinafter, more details about creating a new segment index node will be described with reference to FIG. 6. FIG. 6 schematically shows a block diagram of process 600 for adding segment index nodes to an index according to an example implementation of the present disclosure. As shown in FIG. 6, assuming that an event enters storage system 100 after threshold time point 240, segment index node 610 may be created for the event, and segment index node 610 is added to window index node 520 corresponding to the occurrence time of the event.

Leaf node 620 of segment index node 610 may point to event 630 stored in storage system 100. When a subsequent event that occurs within time window 230 enters storage system 100, a new leaf node may be created for the subsequent event in a similar manner, and the new leaf node may be connected to segment index node 610. According to an example implementation of the present disclosure, an index of all late events that occur within time window 230 may be attached to segment index node 610. According to an example implementation of the present disclosure, if the number of the late events is large (for example, higher than a specified threshold), multiple segment index nodes may be created and the number of the events involved in each segment index node is lower than the specified threshold. Further, the start time and the end time of segment index node 610 may be set based on the occurrence time of each late event.

According to an example implementation of the present disclosure, segment index nodes that include a relatively small number of events may be merged. In this way, the index of storage system 100 may be managed with higher efficiency. According to an example implementation of the present disclosure, after an index has been created for all events that occur within time window 230, the index may be further optimized. For example, two or more segment index nodes within the same time window may be merged. Specifically, if the number of the events of two (or more) segment index nodes within a certain time window is small (for example, lower than a predetermined threshold), these segment index nodes may be merged. According to an example implementation of the present disclosure, two or more segment index nodes in different time windows may be merged. For example, a length threshold of a time segment may be set. Assuming that one segment index node of one time window and another segment index node of a subsequent time window only include a small number of events, the two segment index nodes may be merged.

According to an example implementation of the present disclosure, an additional condition may be set for the merging operation. For example, if it is determined that a total length of two successive time windows corresponding to two successive window index nodes meets a predetermined length condition, the corresponding two segment index nodes in the two successive window index nodes may be merged. For another example, a threshold may be set for the total number of the events of the merged segment index node, and the merging operation is performed only when the total number of the events is lower than the threshold. By using an example implementation of the present disclosure, the structure of the index may be optimized, thereby storing and using the index with higher efficiency.

By using an example implementation of the present disclosure, the created index may include a multi-level index structure, and each non-leaf node in the index may include the time range of the node-related event. For example, the time range of root node 510 relates to the portion between the occurrence time of the earliest event and the occurrence time of the latest event in storage system 100. For another example, the time range of window index node 520 relates to the portion between the start time and the end time of time window 230. For yet another example, the time range of segment index nodes 420, . . . , 422 is the same as time window 230. After the index has been created, the time range in the index may be used to manage time-related operations in storage system 100.

Hereinafter, how to use the index to execute a query in storage system 100 will be described. According to an example implementation of the present disclosure, if a query request for querying an event that meets a specified time condition in storage system 100 is received, the index may be searched for a window index node corresponding to the specified time condition first. Assuming that it is desired to query events that occur between the 0th minute and the 1st minute, by starting from root node 510 of the index, respective child nodes of root node 510 may be searched for child nodes with a time range of the 0th minute to the 1st minute. At this moment, window index node 520 may be found, and then, based on found window index node 520, events that meet the specified time condition may be obtained.

Specifically, the child nodes (i.e., multiple segment index nodes 420, . . . , 422, and 610) of window index node 520 may be searched for events that meet the specified time condition, and the corresponding leaf nodes may be further found in the segment index nodes, thereby determining the address of the event desired to be queried in storage system 100. By using an example implementation of the present disclosure, the time range of each index node in the multi-level index may be used to quickly and accurately find an event corresponding to a specified time condition.

According to an example implementation of the present disclosure, the updating of storage system 100 may be managed by using the established index. It will be understood that a large number of events continue to enter storage system 100 as time passes. Generally speaking, in an application environment such as monitoring, only recent events (for example, events that occurred within the last week) are cared about, but events that occurred much earlier are not cared about. Therefore, storage system 100 is updated periodically, and the update process of storage system 100 may be managed by using the created index here.

According to an example implementation of the present disclosure, if a removal request for removing an event that meets the expiration condition from storage system 100 is received, the index may be searched for a window index node corresponding to the expiration condition. Then, events associated with the window index node may be removed from storage system 100. According to an example implementation of the present disclosure, an expiration time point specified by the expiration condition may fall between two time windows, or may fall within a time window. Hereinafter, description will be made on a case-by-case basis.

Figure 7:
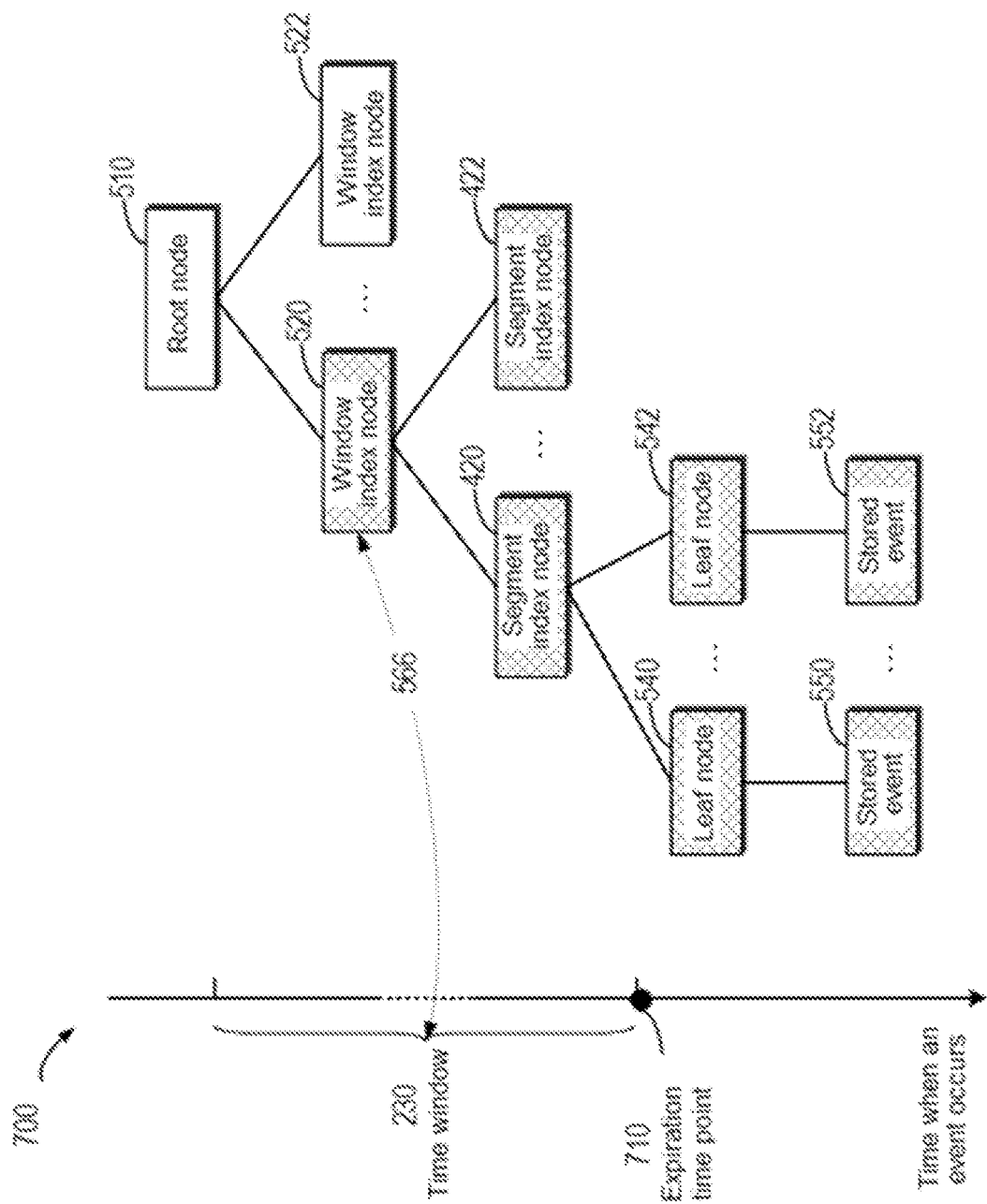
FIG. 7 schematically shows a block diagram of a process for updating an index according to an example implementation of the present disclosure.

If the expiration time point falls between two time windows, the expiration condition will not cross the time window, that is, the occurrence times of all events within the time window before the expiration time all meet the expiration condition. At this moment, all events corresponding to the time window may be deleted. FIG. 7 schematically shows a block diagram of process 700 for updating an index according to an example implementation of the present disclosure. As shown in FIG. 7, expiration time point 710 specified by an expiration condition is located at the end time of time window 230, and thereby the end time of window index node 520 meets the expiration condition. At this moment, all events within time window 230 should be removed, and thereby all events associated with window index node 520 may be removed from the storage system based on window index node 520. Specifically, all expired events within storage system 100 may be found based on a subtree (the portion shown by the shadow in FIG. 7) with window index node 520 as the root node.

Figure 8:
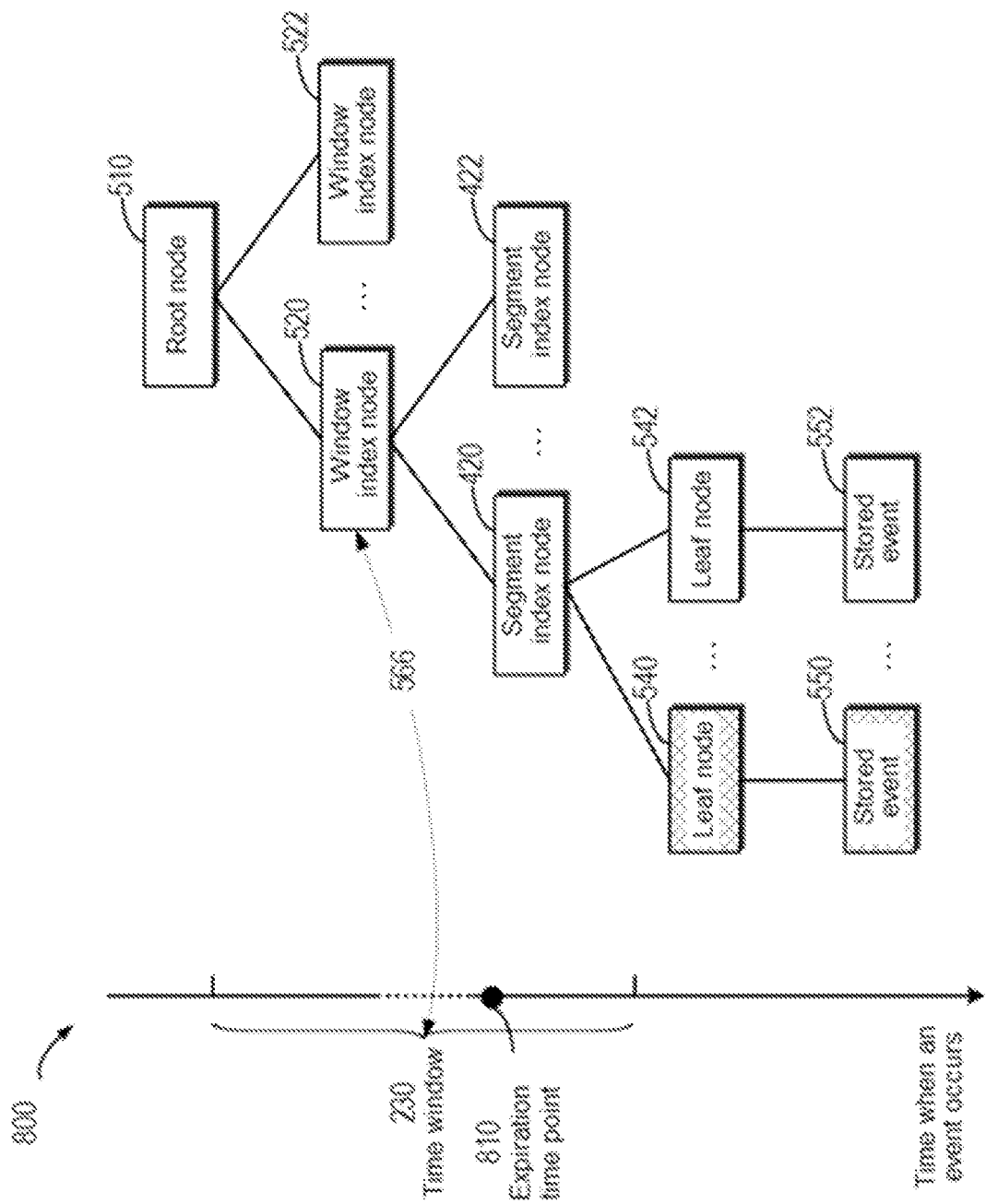
FIG. 8 schematically shows a block diagram of a process for updating an index according to an example implementation of the present disclosure.

According to an example implementation of the present disclosure, the expiration time point may fall within a time window, and at this moment, the expiration condition crosses the time window. That is, one part of the events within the time window meet the expiration condition, while the other part of the events do not meet the expiration condition. Hereinafter, more details about the situation in which part of the events meet the expiration condition will be described with reference to FIG. 8. FIG. 8 schematically shows a block diagram of process 800 for updating an index according to an example implementation of the present disclosure. As shown in FIG. 8, expiration time point 810 specified by the expiration condition is located within time window 230, and thereby the end time of time window 230 does not meet the expiration condition time, and the start time of time window 230 meets the expiration condition.

At this moment, time window 230 may be searched for an event that meets the expiration condition based on multiple segment index nodes in time window 230 and the expiration condition. As shown in FIG. 8, leaf node 540 of the event that meets the expiration condition may be found in segment index node 420, and leaf node 540 and stored event 550 shown by the shadow may be deleted. Similar processing may be performed on each segment index node respectively to find all events that meet the expiration condition.

By using an example implementation of the present disclosure, an event that meets the expiration condition may be found quickly based on the index of storage system 100. In this way, expired data in storage system 100 may be removed accurately and effectively, thereby ensuring that storage system 100 may include sufficient available storage space.

According to an example implementation of the present disclosure, after expired data has been removed from storage system 100, the index may be updated based on the events that have been removed from storage system 100. For example, in the indexes shown in FIG. 7 and FIG. 8, the portions shown by the shadow may be deleted to ensure that each node in the index corresponds to the latest data in storage system 100.

Examples of the method according to the present disclosure have been described in detail above with reference to FIG. 2 to FIG. 8, and implementations of a corresponding apparatus will be described below. According to an example implementation of the present disclosure, an apparatus for managing an index of a storage system is provided. The apparatus includes: a receiving module configured to receive multiple events included in a data stream to be stored in a storage system; a determination module configured to determine at least one event among the multiple events that occurs within a time window according to a predetermined length of the time window and occurrence times of the multiple events; a creation module configured to create a window index node based on at least one event, the window index node including an index of the at least one event; and an adding module configured to add the window index node to the index in response to determining that the current time point meets a threshold time point corresponding to the time window, the threshold time point indicating that the number of received events that have occurred within the time window in the data stream reaches a threshold number. According to an example implementation of the present disclosure, the apparatus further includes modules configured to execute other steps of method 300 described above.

Figure 9:
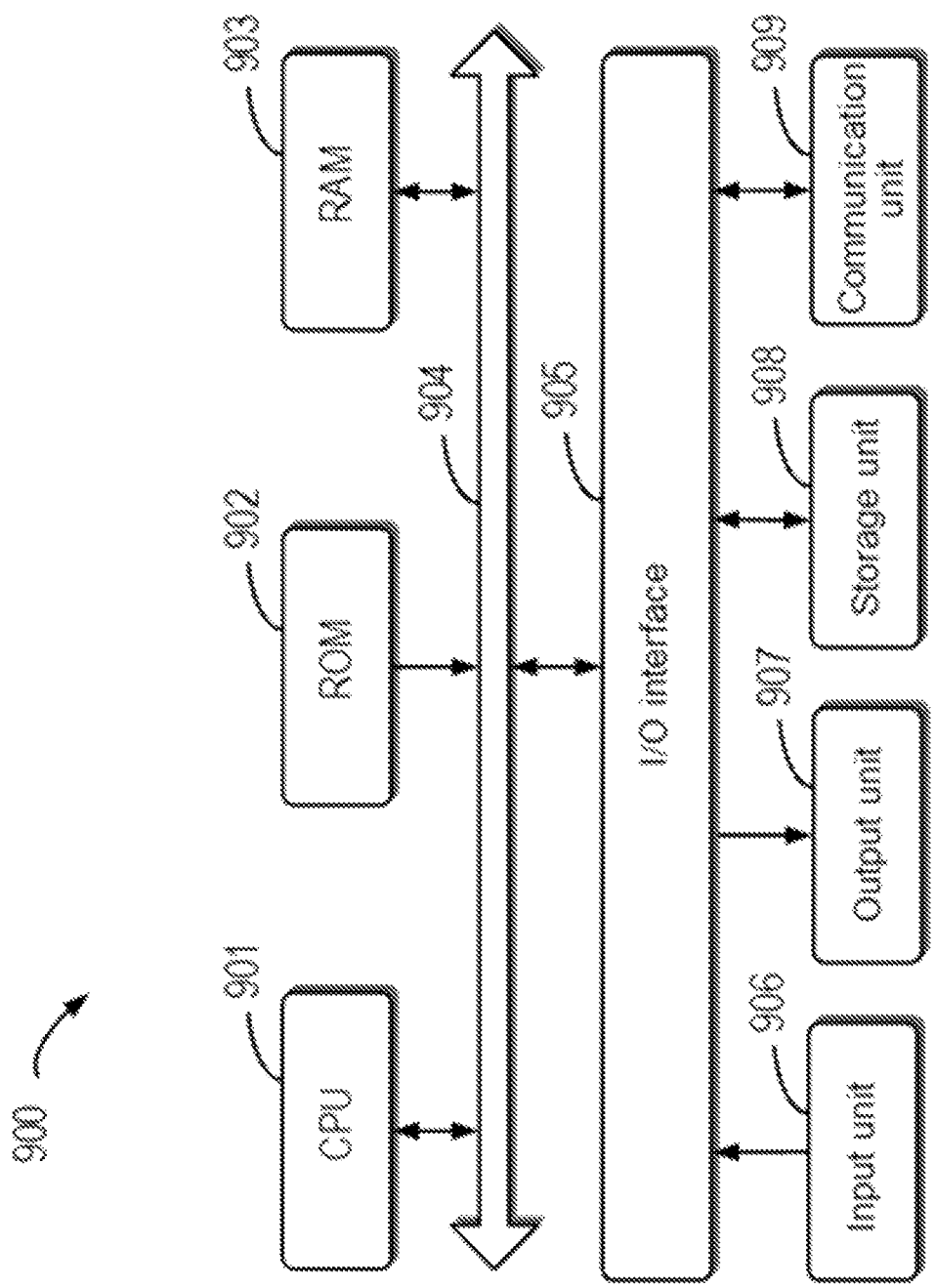
FIG. 9 schematically shows a block diagram of a device for managing an index of a storage system according to an example implementation of the present disclosure.

FIG. 9 schematically shows a block diagram of device 900 for managing an index of a storage system according to an example implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, part or all of the computer program may be loaded in and/or installed to device 900 through ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided. The electronic device includes: at least one processor; a volatile memory; and a memory coupled to the at least one processor. The memory has instructions stored therein. When executed by the at least one processor, the instructions cause the device to execute a method for managing an index of a storage system. The method includes: receiving multiple events included in a data stream to be stored in a storage system; determining at least one event among the multiple events that occurs within a time window according to a predetermined length of the time window and occurrence times of the multiple events; creating a window index node based on at least one event, and the window index node including an index of the at least one event; and adding the window index node to the index in response to determining that the current time point meets a threshold time point corresponding to the time window, the threshold time point indicating that the number of received events that have occurred within the time window in the data stream reaches a threshold number.

According to an example implementation of the present disclosure, the creating a window index node based on at least one event includes: creating multiple segment index nodes for the time window using multiple computing resources in a storage system, respectively, a segment index node in the multiple segment index nodes corresponding to an event received by a computing resource of the multiple computing resources among the at least one event; and adding the segment index node to the window index node.

According to an example implementation of the present disclosure, the method further includes: setting the segment index nodes in the window index node to a read-only state.

According to an example implementation of the present disclosure, the method further includes: creating another segment index node based on the event in response to determining that an event in the data stream is received after a threshold time point; and adding the another segment index node to the window index node.

According to an example implementation of the present disclosure, the method further includes: searching the index for a window index node corresponding to a specified time condition in response to receiving a query request to query an event that meets the specified time condition in the storage system; and obtaining the event that meets the specified time condition based on the window index node.

According to an example implementation of the present disclosure, the method further includes at least any one of: merging at least two segment index nodes in multiple segment index nodes; and merging at least two segment index nodes in two consecutive window index nodes in response to determining that a total length of the two consecutive time windows corresponding to two consecutive window index nodes in the index meets a predetermined length condition.

According to an example implementation of the present disclosure, the threshold time point is determined based on the number of events that occur within the time window, and the method is executed in parallel at multiple computing resources in the storage system.

According to an example implementation of the present disclosure, the method further includes: searching the index for a window index node corresponding to an expiration condition in response to receiving a removal request for removing an event that meets the expiration condition from the storage system; and removing the event associated with the window index node from the storage system.

According to an example implementation of the present disclosure, the removing the events associated with the window index node from the storage system includes at least any one of: removing all events associated with the window index node from the storage system in response to determining that the end time of the window index node meets the expiration condition; and removing the events associated with at least part of the segment index nodes in multiple segment index nodes from the storage system based on the multiple segment index nodes and the expiration condition, in response to the end time not meeting the expiration condition time and the start time of the window node meeting the expiration condition.

According to an example implementation of the present disclosure, the method further includes: updating the index based on the events that have been removed from the storage system.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium has machine-executable instructions stored thereon, and when executed by at least one processor, the machine-executable instructions cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Smalltalk and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

What is claimed is:

1. A method, comprising:
receiving, by a system comprising a processor, multiple events comprised in a data stream to be stored in a storage system;
determining at least one event among the multiple events that occurs within a time window according to a defined length of the time window and occurrence times of the multiple events;
creating a window index node based on the at least one event, the window index node comprising an index of the at least one event; and
adding the window index node to the index in response to determining that a current time point satisfies a threshold time point corresponding to the time window, the threshold time point indicating that a number of received events that occur within the time window in the data stream reaches at least a threshold number.

2. The method according to claim 1, wherein the creating the window index node based on the at least one event comprises:
creating multiple segment index nodes for the time window using multiple computing resources in the storage system, respectively, wherein segment index nodes in the multiple segment index nodes correspond to events in the at least one event that are received by computing resources in the multiple computing resources; and
adding the segment index nodes to the window index node.

3. The method according to claim 2, further comprising: setting a state of the segment index nodes in the window index node to a read-only state.

4. The method according to claim 2, further comprising:
creating another segment index node based on an event in the data stream, in response to determining that the event is received after the threshold time point; and
adding the other segment index node to the window index node.

5. The method according to claim 2, further comprising at least one of:
merging a first plurality of segment index nodes in the multiple segment index nodes; or
merging a second plurality of segment index nodes in two successive window index nodes in response to determining that a total length of two successive time windows corresponding to the two successive window index nodes in the index satisfies a defined length condition.

6. The method according to claim 2, further comprising:
searching the index for a window index node corresponding to an expiration condition in response to receiving a removal request for removing an event that satisfies the expiration condition from the storage system; and
removing the event associated with the window index node from the storage system.

7. The method according to claim 6, wherein the removing the event associated with the window index node from the storage system comprises at least one of:
removing all events associated with the window index node from the storage system in response to determining that an end time of the window index node satisfies the expiration condition; or
removing at least some events associated with at least some segment index nodes in the multiple segment index nodes from the storage system based on the multiple segment index nodes and the expiration condition, in response to the end time not satisfying the expiration condition time and a start time of the window index node satisfying the expiration condition.

8. The method according to claim 7, further comprising at least one of:
updating the index based on all the events that have been removed from the storage system; or
updating the index based on at least the some events that have been removed from the storage system.

9. The method according to claim 1, further comprising:
searching the index for at least one window index node corresponding to a specified time condition in response to receiving a query request to query for an event that satisfies the specified time condition in the storage system; and
obtaining the event that satisfies the specified time condition based on the at least one window index node.

10. The method according to claim 1, wherein the threshold time point is determined based on the number of received events that occur within the time window, and wherein the method is executed in parallel at multiple computing resources in the storage system.

11. A device, comprising:
at least one processor; and
a memory coupled to the at least one processor and having instructions stored therein, wherein the instructions, when executed by the at least one processor, cause the device to perform operations, comprising:
receiving multiple events comprised in a data stream to be stored in a storage system;
determining at least one event among the multiple events that occurs within a time window according to a predetermined length of the time window and occurrence times of the multiple events;
creating a window index node based on the at least one event, the window index node comprising an index of the at least one event; and
adding the window index node to the index in response to determining that a current time point meets a threshold time point corresponding to the time window, the threshold time point indicating that a number of received events that occur within the time window in the data stream has reached a threshold number.

12. The device according to claim 11, wherein the creating the window index node based on the at least one event comprises:
creating multiple segment index nodes for the time window using multiple computing resources in the storage system, respectively, wherein segment index nodes in the multiple segment index nodes correspond to ones of the at least one event that are received by computing resources in the multiple computing resources; and
adding the segment index nodes to the window index node.

13. The device according to claim 12, wherein the operations further comprise: setting the segment index nodes in the window index node to be in a read-only state.

14. The device according to claim 12, wherein the operations further comprise:
creating another segment index node based on an event in the data stream, in response to determining that the event is received after the threshold time point; and
adding the other segment index node to the window index node.

15. The device according to claim 12, wherein the operations further comprise at least one of:
merging a first group of segment index nodes in the multiple segment index nodes; or
merging a second group of segment index nodes in two successive window index nodes in response to determining that a total length of two successive time windows corresponding to the two successive window index nodes in the index meets a predetermined length condition.

16. The device according to claim 12, wherein the operations further comprise:
searching the index for a window index node corresponding to an expiration condition in response to receiving a removal request for removal of an event that meets the expiration condition from the storage system; and
removing the event associated with the window index node from the storage system.

17. The device according to claim 16, wherein the removing the event associated with the window index node from the storage system comprises at least one of:
removing all events associated with the window index node from the storage system in response to determining that an end time of the window index node meets the expiration condition;

removing a group of events associated with at least part of segment index nodes of the multiple segment index nodes from the storage system based on the multiple segment index nodes and the expiration condition, in response to the end time not meeting the expiration condition time and a start time of the window index node meeting the expiration condition; or updating the index based on at least one of all the events associated with the window index node from the storage system or the group of events that have been removed from the storage system.

18. The device according to claim 11, wherein the operations further comprise:

searching the index for a window index node corresponding to a specified time condition in response to receiving a query request to query for an event that meets the specified time condition in the storage system; and obtaining the event that meets the specified time condition based on the window index node.

19. The device according to claim 11, wherein the threshold time point is determined based on the number of events that occur within the time window, and the operations are executed in parallel at multiple computing resources in the storage system.

20. A computer program product that is stored on a non-transitory computer-readable medium and comprises machine-executable instructions, that when executed, cause a system comprising a processor to perform operations, comprising:

receiving events comprised in a data stream to be stored in a storage system;

determining an event of the events that occurs within a time window according to a defined length of the time window and occurrence times of the events;

based on the event, creating a window index node comprising an index of the event; and in response to determining that a current time satisfies a function of a threshold time corresponding to the time window, adding the window index node to the index, wherein the function of the threshold time being satisfied indicates that a number of received events corresponding to times within the time window in the data stream is at least a threshold number.

\* \* \* \* \*